March 5, 1963 S. HERTZBERG 3,079,684
ELECTRICALLY-POWERED DRY SHAVER CONVERTIBLE TO MANUAL
POWER HAVING REINFORCED SHEARING MEANS
AND DEBRIS COLLECTING MEANS
Filed April 7, 1961 5 Sheets-Sheet 1
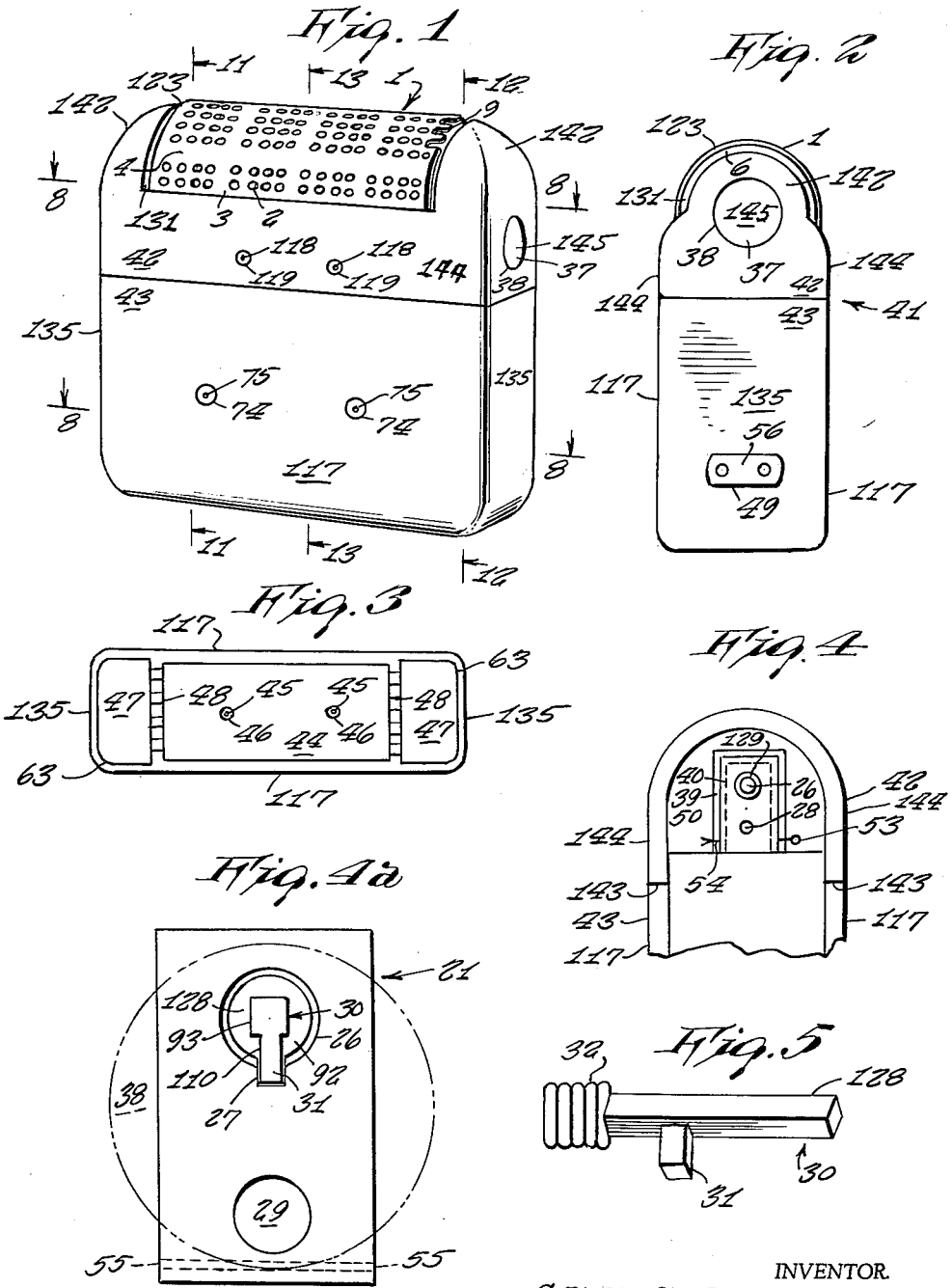
INVENTOR.
SAMUEL HERTZBERG

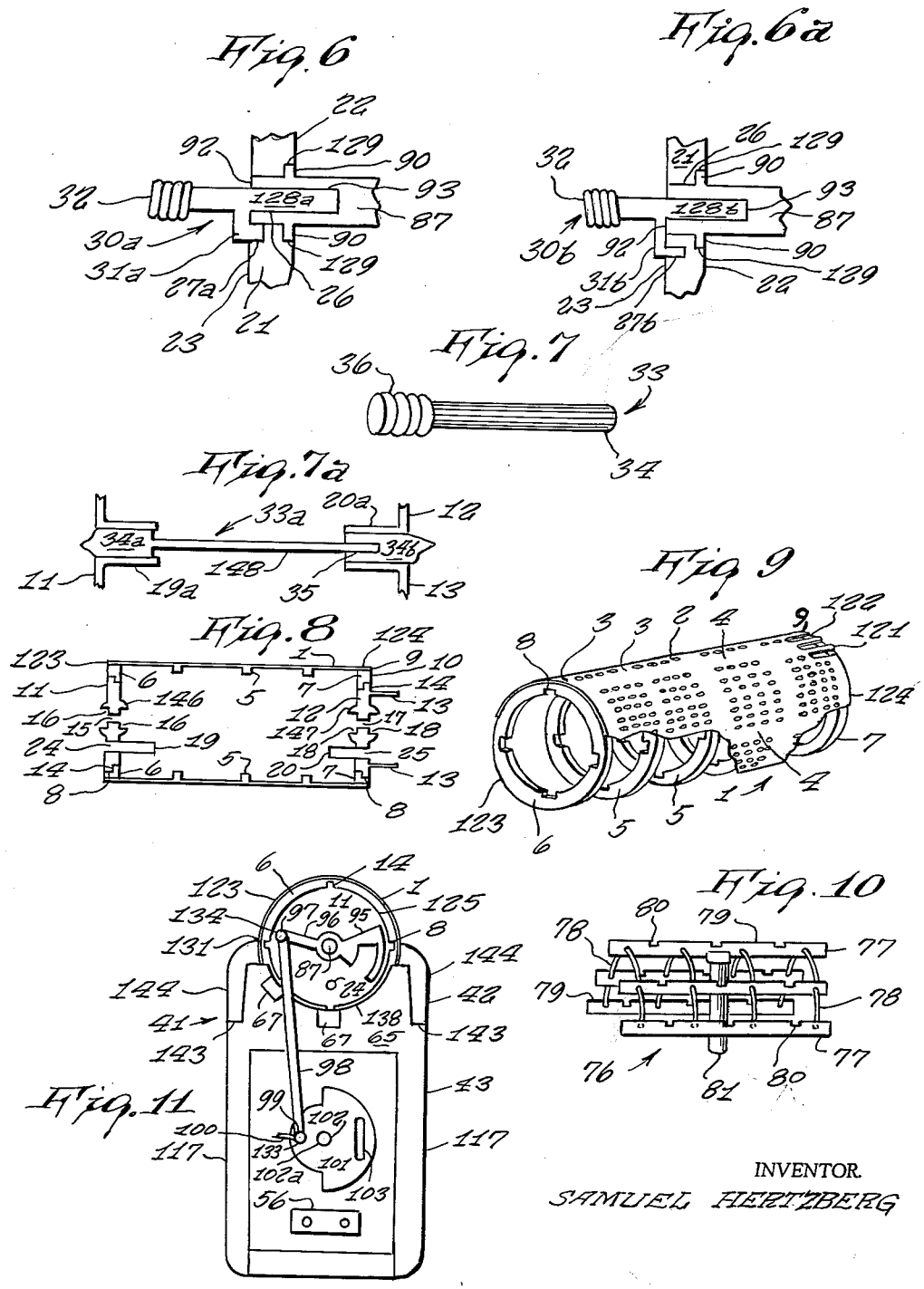

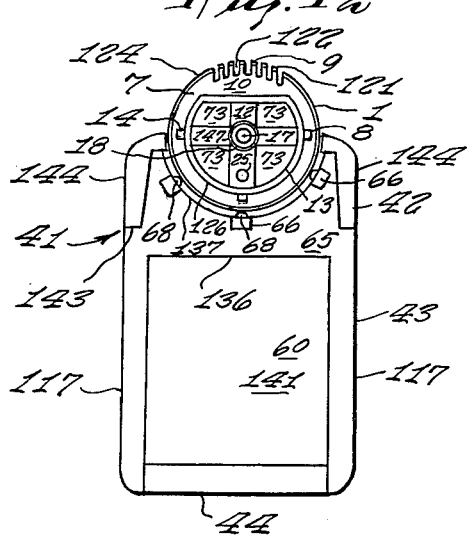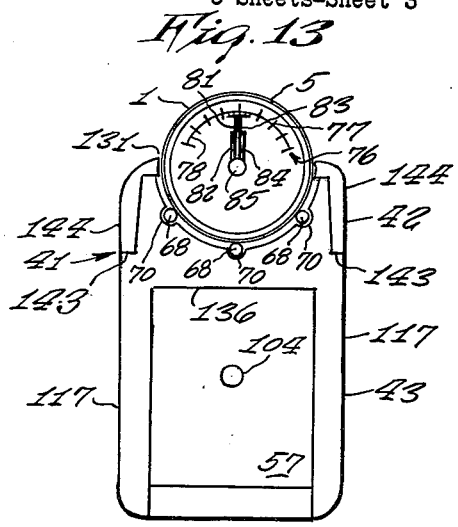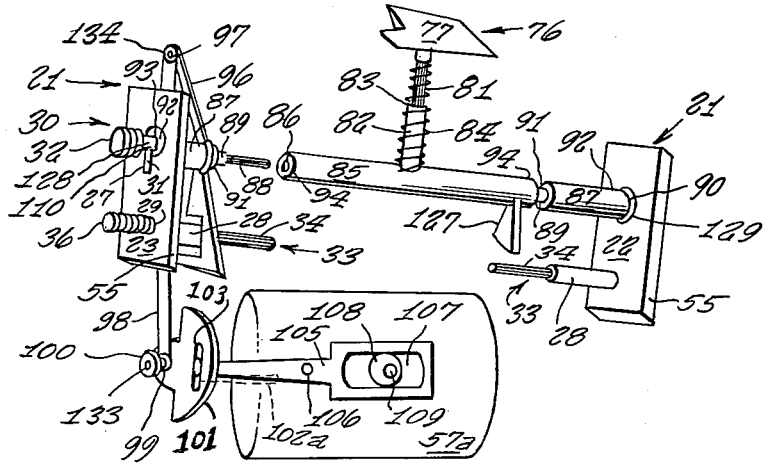

Fig. 15

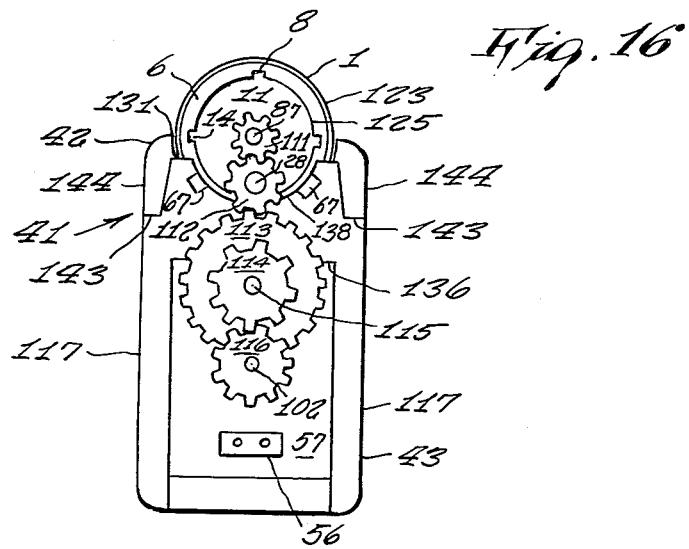
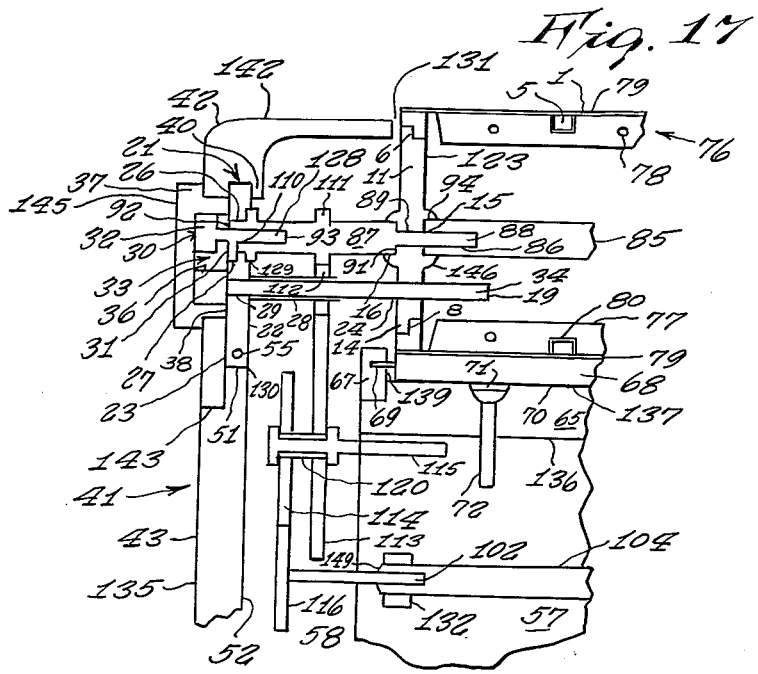

United States Patent Office 3,079,684
Patented Mar. 5, 1963

3,079,684
ELECTRICALLY-POWERED DRY SHAVER CONVERTIBLE TO MANUAL POWER HAVING REINFORCED SHEARING MEANS AND DEBRIS COLLECTING MEANS
Samuel Hertzberg, New York, N.Y.
(740 Grand Concourse, Bronx 51, N.Y.)
Filed Apr. 7, 1961, Ser. No. 101,388
12 Claims. (Cl. 30—34)

My invention electrically-powered dry shaver convertible to manual power having reinforced shearing means and debris collecting means is an improvement in that variety of dry shaver wherein a perforated grid is passed over the surface to be shaved and the hairs trapped in the perforations are sheared off by the coaction of the sharp-edged perforations and the cutting edges of blades in contact with the interior surface of the grid. The shaving apparatus I propose to describe, readily convertible from one to the other indicated source of power, has many attractive features.

Electric shavers, powered from wall outlets, are today highly efficient instruments. But there are occasions when it is not possible or convenient to utilize the power normally available at a wall outlet; for such outlets may be temporarily inaccessible for a variety of reasons, or the power supplied may be unsuitable because of voltage or of type, or the noise generated in electric circuits may interfere with comfortable radio and television listening and viewing. Battery-powered shavers, of which many brands are nowadays marketed, are with increasing frequency being utilized as a substitute. However, the need to replace or recharge batteries is both an expense and a nuisance. My invention, a combination instrument capable of operating on both manual and electric power, has all the advantages of each of the aforementioned classes of electric shavers without their limitations.

Furthermore, the two methods of shaving possible with this instrument (the grid either rotating or immobilized in relation to the casing) complement each other. The nature of the beard growth varies with different persons and, indeed, in different areas of the face of the same person. An additional complication stems from the variables of temperature and moisture content of the air contacting the surface to be shaved. It is possible therefore, by shifting as required from one means to the other, to more nearly than heretofore discover in a single apparatus versatility in meeting these shifting shaving needs.

As I proceed, the realization of these and other objects and advantages will become apparent to persons skilled in the art.

My invention is illustrated in the accompanying drawings in which:

FIG. 1 is a perspective view of all forms of the completely assembled instrument;

FIG. 2 is a view of the narrow side of the shaver, which is not visible in FIG. 1;

FIG. 3 is a view of the bottom side of the shaver, which is not visible in FIG. 1;

FIG. 4 is a view of a bearing block as it would appear (in all forms of the invention) seated in its tri-walled sleeve against an inner narrow wall of the shaver casing;

FIG. 4a is a view of the other side of a bearing block showing the parts which would be visible through a key cap aperture in the shaver casing and illustrating particularly how the shaft key of FIG. 5 (herein sectioned) could be inserted to lock a stub shaft outer end to the bearing block;

FIG. 5 is a perspective view of a shaft key with prong and fin of rectangular configuration, the fin (as indicated in FIG. 4a) capable of simultaneously engaging a fin slit in a stub shaft outer end and a fin aperture in the outer side of a bearing block;

FIG. 6 is a sectioned view of a shaft key with modified fin capable of use in all forms of the invention, the rectangular shaped prong splined into a conforming recess in a stub shaft outer end and the rectangular shaped fin bridging the stub shaft outer end (which lacks a fin slit) and seating in part in a fin aperture in the outer side of a bearing block;

FIG. 6a is a sectioned view of a shaft key similar in all respects to the shaft key of FIG. 6 except that the fin (as illustrated) is capable of bridging both a stub shaft outer end and a portion of the surface of the outer side of a bearing block to seat in part in a fin aperture in the aforesaid bearing block;

FIG. 7 is a perspective view of a grid key with a splined shaft;

FIG. 7a is a sectioned view of two cooperating grid keys (knobs missing) similar to the one depicted in FIG. 7 but modified so that one of the shafts has a prong which is capable of traversing the interior of the grid and seating in a conforming aperture in the shaft end of the other, an assembly whose use is optional in the forms of the invention employing a single cutting edge base frame which is designed to oscillate;

FIG. 8 is a sectioned view of the grid, with the grid plates inserted in the end annular members, taken on the lines 8—8 of FIG. 1 and utilized in all forms of the invention;

FIG. 9 is a perspective view of the cylindrical grid used in all forms of the invention, the portion of the grid which is cut away exposing an end annular member and two internal annular members;

FIG. 10 is a perspective view of the cutting edge base frame used in all forms of the invention with a supporting member affixed to the undercarriage consisting of a splined projection;

FIG. 11 is a sectional view of the shaver taken on the line 11—11 of FIG. 1 and particularly illustrates the mechanism utilized in two forms of the shaver for converting the rotary motion of the motor shaft to oscillating motion of the cutting edge;

FIG. 12 is a sectional view of the shaver taken on the line 12—12 of FIG. 1 and illustrates the means by which, in all forms of the shaver, the debris of shaving is evacuated from the interior of the grid;

FIG. 13 is a sectional view of the shaver taken on the line 13—13 of FIG. 1 and depicts details in that area of the form of the shaver which employs parallel blade and motor shafts and a single cutting edge base frame intended for oscillating motion, the relation of the cutting edge base frame and its associated members to the internal annular member and the blade shaft and of the rollers to the grid and the casing block being correct for all forms of the invention;

FIG. 14 is a perspective view of the relationship between the blade shaft, the stub shafts, the bearing blocks, the shaft keys of the type illustrated in FIG. 5, the grid keys of the type illustrated in FIG. 7 (an association of members which can be used in all forms of the invention), and the mechanism (utilized in one form of the invention, for converting the rotary motion of a motor shaft oriented at right angles to the blade shaft to oscillating motion of the cutting edges;

Figure 15:
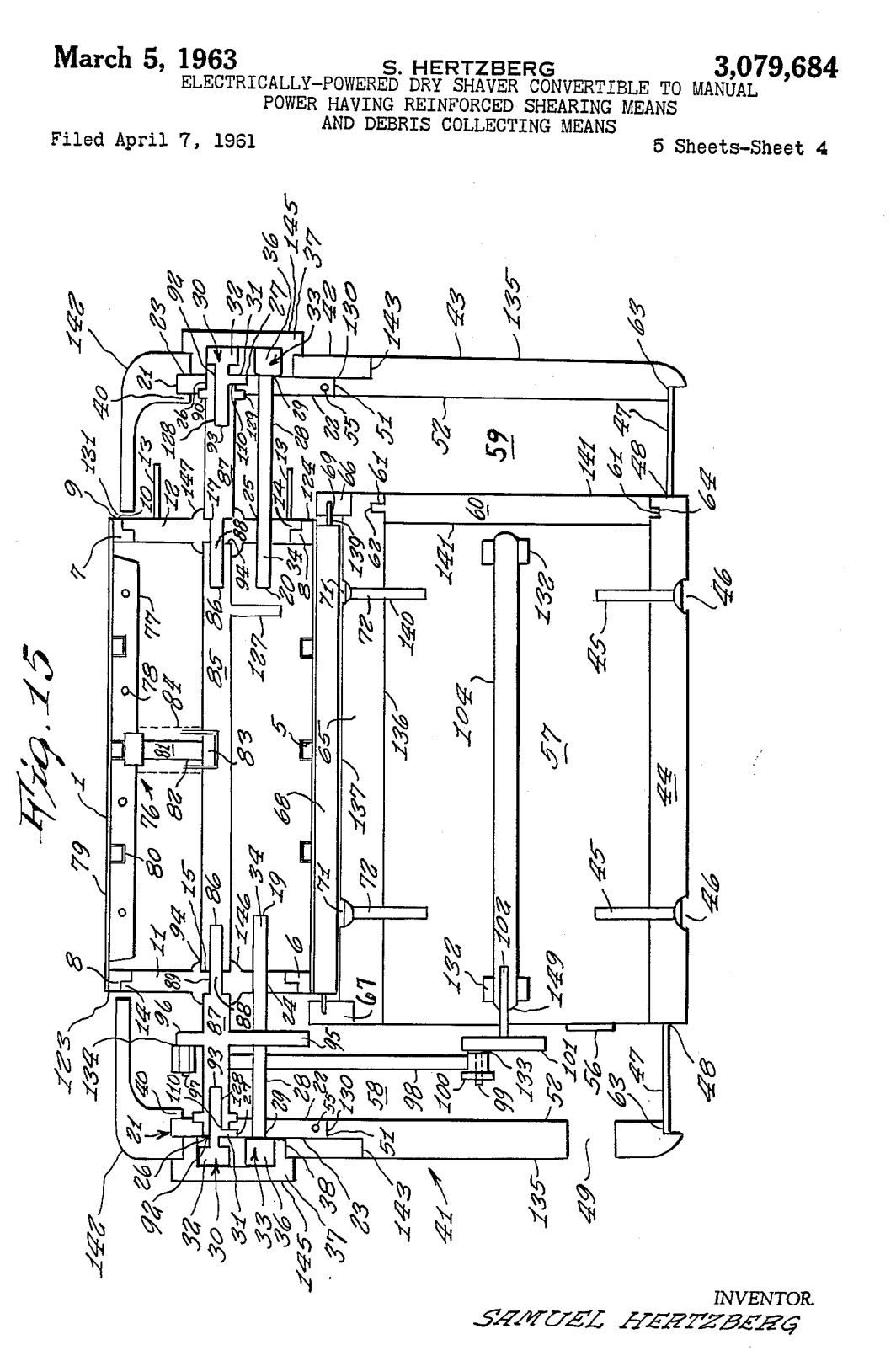

FIG. 15 is a sectional view of the shaver taken on the same plane as FIG. 8 which, except for a power mechanism representative of the form of the invention employing parallel motor and blade shafts and related means for converting the rotary motion of the motor shaft into oscillating motion of the blade shaft and the cutting edges, is generally applicable to all forms of the invention;

FIG. 16 is a sectional view of the shaver taken on the same plane as FIG. 11 and illustrates the form of the instrument which utilizes parallel motor and blade shafts and employs a gear train to transmit the rotary motion of the motor shaft to the blade shaft and the cutting edges; and FIG. 17 indicates so much of the sectional view depicted in FIG. 15 as is necessary to demonstrate how the gear train of FIG. 16 can be substituted for the transmission means of the said FIG. 15 so that the rotary motion of the motor shaft can be transmitted to the blade shaft and the counterpoised cutting edge base frames.

A careful examination of these drawings (and a study of the descriptions which follow) will demonstrate that they illustrate three forms or species of the shaver. The differences stem entirely from the means of transmitting the motion of the motor shaft to the cutting edges; and are limited to a comparatively small number of elements. Thus, there are two forms which utilize parallel motor and blade shafts; but one employs a mechanism for converting the rotary motion of the motor shaft to oscillating motion of the blade shaft and the associated cutting edges, whereas the other uses a gear train to transmit the rotary motion unaltered. The third form has blade and motor shafts oriented at right angles to each other; and the rotary motion of the motor shaft is converted by an eccentric to oscillating motion which, in turn (and much as in the first of the forms mentioned above), is transmitted to the blade shaft and the cutting edges. The mechanisms for converting from electric to manual power, except for some optional variation, are applicable to all of the forms. Accordingly, like parts are throughout assigned the same reference numerals; occasionally, the letters "a" and "b" are associated with such numerals for additional ease in identification.

It is expedient at this point to describe in detail certain of the structures already alluded to in the drawings and the text.

A cutting edge base frame 76 (FIG. 10 and also FIGURES 13–15 and 17) comprises at least one cutting edge base 77 and, if more than one cutting edge base 77, connecting means such as props 78 for supporting and firmly attaching the cutting edge bases 77 to each other. The cutting edge bases 77 must all be radially-inclined so that, if their edges are ground to provide cutting edges 79, the cutting edges 79 will be aligned so as to bring them simultaneously into transverse abutment on a radial inclination with the interior surface of the cylindrical grid 1 (FIG. 9 and also FIGURES 1, 2, 8, 11–13, 15–17) when the supporting member affixed to the undercarriage of the cutting edge base frame 76 is brought into the cooperating position with its mate and thereby related to the axially-positioned blade shaft 85 (an arrangement illustrated in FIGURES 13–15 and 17). The cutting edges 79 must have recesses 80 to permit them to bridge the internal annular members 5 which, in spaced concentric arrangement, are affixed to and reinforce the grid 1. Similarly, the cutting edge bases 77 which lack cutting edges 79, if they extend sufficiently toward the interior surface of the grid 1, must have recesses 80.

From the foregoing it must be apparent that a cutting edge base frame 76 may consist of a single cutting edge base 77 or of many joined together. Cutting edges 79 are provided by grinding the edges of the cutting edge bases 77; i.e., they are ground out of the same stock and are integral with them. Indeed, a combination structure comprising a cutting edge base frame 76 and its component cutting edge bases 77 and props 78, cutting edges 79, and a supporting member attached to the undercarriage of the cutting edge base frame 76 may be ground out of the same piece of stock instead of comprising separate members fitted and joined together. Finally, there need actually be no apertures between the cutting edge bases 77; they may project, as though the props 78 were fused together side-by-side, correctly directioned out of a single platformlike structure.

In the drawing (FIGURES 13–15), the supporting member affixed to the undercarriage of the cutting edge base frame 76 is a splined projection 81 designed to fit into the conforming recess 83 of the hollow standard 82 which is affixed perpendicular to the blade shaft 85. A spiral spring 84, which is coiled about the union of the splined projection 81 and the hollow standard 82, urges the cutting edges 79 into simultaneous and transverse abutment on a radial inclination with the interior surface of the grid 1. It is obvious that the positions of the splined projection 81 and the hollow standard 82 can be reversed without, in any way, affecting the operation of the instrument.

The grid 1 (FIGS. 1, 2, 8, 9, 11–13, 15–17) is a very thin cylindrical shield of tough, flexible material. It has perforations 2 which permit the hairs to enter as the grid 1 is drawn or rolled on the skin. The transverse strips 4 of unperforated surface, as well as the annular strips 3 of unperforated surface, help to impart strength and rigidity to the surface. The internal annular members 5 and the end annular members 6 and 7 perform similarly to an even greater extent.

The latter three (i.e., the internal annular members 5, the end annular member 6 and the end annular member 7) are equal in diameter when measured to their outer circumferences and, since they are permanently affixed in a spaced concentric arrangement in circumferential abutment with the interior surface of the grid 1, they determine the cylindrical configuration of the grid 1. The end annular members 6 and 7 differ from the internal annular members 5 in that they must be of a thickness sufficient to allow for the formation of the sprocket recesses 8 on their outer sides. The end annular member 7, to which is molded the serrated edge 9 of the grid 1, has a hollowed section 10 directly beneath this serrated edge 9; and this hollowed section 10, as can be observed in the drawings (FIGURES 8, 9, 12 and 15), is of greater depth than other portions of the member and is serrated to conform (to the limited extent allowed by the relatively thin annular member 7) to the individual serrations 121 of the serrated edge 9. This construction, while maintaining intact the basic structural continuity of the end annular member 7 and providing support for the individual serrations 121 of the serrated edge 9, permits long hairs to be directed through the slits 122 of the end annular member 7 into the area of the grid 1 where the cutting edges 79 coact with it.

The grid plate 11 (FIGURES 8, 11, 15–17) is designed to close the grid end 123 located on the power side of the shaver. It has sprockets 14 which are seated in the sprocket recesses 8 of the end annular member 6. These sprockets 14 are integral with the grid plate 11 but protrude from its circular edge 125. Thus, except for the thickened area 146 on each side of the hub aperture 15, the grid plate 11 is flush on both its sides with the end annular member 6 when the sprockets 14 are seated in the sprocket recesses 8; and, but for openings still to be described, completely closes off the grid end 123. The openings comprise, first, the hub aperture 15 through which the splined projection 88 of one stub shaft 87 will pass in order to enter and seat in the conforming recess 86 at one end 94 of the blade shaft 85, the smooth rounded section 89 being positioned in the hub aperture 15 where it serves as a pivot; second, the expanded sections 16 of each end of the hub aperture 15, one seating the inner end 91 of the indicated stub shaft 87 and the other seating the aforementioned end 94 of the blade shaft 85, both functioning therein as pivots; and, third, the aperture 24 (from which may extend a hollow standard 19 into the grid 1 interior), and which is intended to receive either a grid key 33 or 33a. This assembly (detailed in FIGURES 14, 15 and 17), so long as the stub shaft 87 and the blade shaft 85 are maintained in the described relationship, will serve to lock the grid plate 11 into the required position.

The grid plate 12 (FIGURES 8, 12 and 15), designed to operate in relation to the grid end 124 located on the debris side of the shaver, is comparable to the grid plate 11. Indeed, the differences stem essentially from the need for the grid plate 11 to prevent the flow of the debris of shaving into the vicinity of the power mechanism whereas, on the contrary, the grid plate 12 is fashioned so as to permit the debris to be evacuated from the interior of the grid 1. In addition, the contour of the end annular member 7 — specifically, the proportionately greater depth of the hollowed section 10—requires a corresponding accommodation in the configuration of the grid plate 12. Otherwise, except for the debris gaps 73 (which permit evacuation of the debris of shaving from the interior of the grid 1) and the debris shield 13 (whose function is to deflect the debris into the debris space 59), the grid plates 11 and 12 perform similarly. The sprockets 14 of the latter, as is true of the former, seat in sprocket recesses 8 (in this instance, of the end annular member 7). These sprockets 14 are integral with the grid plate 12 but protrude from its modified circular edge 126. The grid plate 12, except for the thickened area 147 on each side of the hub aperture 17, is flush on both its sides with the end annular member 7 when the sprockets 14 are fitted into the sprocket recesses 8. It must be noted that the debris gaps 73 may be of any configuration which will permit them to perform satisfactorily without interfering with the other demands made on the grid plate 12. For the rest, what has been said of the other parts of the grid plate 11 holds for the comparable portions of the grid plate 12; and to match the members of one group with those of the other is sufficient to describe their duties. Accordingly, the hub aperture 15 has its counterpart in the hub aperture 17; and the expanded sections 16 in the expanded sections 18, the aperture 24 in the aperture 25, and the hollow standard 19 in the hollow standard 20. The debris shield 13, already mentioned, projects from the grid plate 12 (away from the interior of the grid 1) and is integral with it; it follows the general contour of the modified circular edge 126 and entirely encompasses the debris gaps 73.

The grid plates 11 and 12, or at least so much of them as come into contact with the related blade shaft 85-stub shafts 87 assemblies, should be constructed of bearing material. Furthermore, though the drawings indicate that the splined projections 88 and the smooth rounded sections 89 are integral with the stub shafts 87 and the conforming recesses 86 are in the blade shaft 85 ends 94, this arrangement can be reversed without affecting the ability of the members to perform their described functions; i.e., the smooth rounded sections 89 and the splined projections 88 can emanate from the blade shaft 85 ends 94, the splined projections 88 being received in conforming recesses 86 in the stub shafts 87 inner ends 91.

The bearing blocks 21 (FIGURES 4, 4a, 6, 6a, 14, 15 and 17) are of generally rectangular configuration. The apertures 26, which should be lined with bearing material, pierce them completely and are designed to receive the outer ends 92 of the stub shafts 87 (which may rotate or oscillate in them). Depending on the type of shaft key employed (whether 30, 30a or 30b of FIGURES 5, 6 and 6a respectively), fin apertures (27, 27a or 27b) shaped to conform to the contours of the fins (31, 31a or 31b) of the shaft keys (30, 30a or 30b) must be cut into the outer sides 23 of the bearing blocks 21. The fin apertures (27, 27a or 27b) need not completely penetrate the bearing blocks 21. The shaft key 30 (which is preferred) is designed so that, when the prong 128 has penetrated as far as it can into the conforming recess 93 in the outer end 92 of the stub shaft 87, the fin 31 will lodge in both the fin slit 110 of the outer end 92 and the fin aperture 27 of the bearing block 21; and in this construction, therefore, the fin aperture 27 must merge with the aperture 26 (as can be ascertained from FIG. 4a). This is equally true of the fin aperture 27a (FIG. 6) and the aperture 26 if there is no fin slit 110 in the outer end 92 of the stub shaft 87 and a shaft key 30a (with prong 128a) is used. The fin 31a of the shaft key 30a must, however, be fashioned so that it can bridge the outer end 92 and seat in the fin aperture 27a. The fin aperture 27b (FIG. 6a), on the other hand, requires a shaft key 30b whose fin 31b will (when the prong 128b has penetrated into the conforming recess 93) bridge both the outer end 92 and a portion of the adjacent outer side 23 of the bearing block 21. Furthermore, though the prongs (128, 128a, and 128b) may be smoothly cylindrical in contour, additional utility will result (as will become apparent later) if they are splined into the conforming recesses 93. (A spline of rectangular configuration is depicted in the drawings). In any event, when a shaft key (30, 30a or 30b) is properly inserted so that the prong (128, 128a or 128b) and the fin (31, 31a or 31b) respectively engage the outer end 92 of a stub shaft 87 and the fin aperture (27, 27a or 27b) of a bearing block 21, the effect will be to lock or immobilize the entire assembly consisting of the two stub shafts 87, the blade shaft 85 between them, and all the associated members which would normally revolve or oscillate with them.

The bearing blocks 21 also have apertures 29 which completely pierce them and which lead into hollow standards 28 which are erected on and are perpendicular to the inner sides 22 of the bearing blocks 21 (relationships which are visible in FIGURES 4 and 4a, 14, 15 and 17). These apertures 29 and the hollow standards 28 are aligned with the aperture 24 and the hollow standard 19 of the grid plate 11 and with the aperture 25 and the hollow standard 20 of the grid plate 12. Thus, if a grid key 33 is inserted from the outer side 23 of a bearing block 21 into the aperture 29 and the hollow standard 28 so that, on the power side of the shaver, it will bridge the gap to the grid plate 11 and penetrate into the aperture 24 and the hollow standard 19, it will prevent the rotation of the grid 1. If the debris side of the shaver is similarly treated, with the grid plate 12 and the aperture 25 and the hollow standard 20 substituting for the comparable members on the power side, a like result will be achieved. With a grid key 33 correctly inserted on one or preferably both sides of the shaver, the grid 1 can be successfully immobilized while the electric motor is in operation. It is optional whether the grid keys 33 are smoothly cylindrical, threaded or splined in contour providing, in each instance, the cooperating members conform to the selected construction.

In assemblies where only a single union of a hollow standard 82 and a splined projection 81 is related to the blade shaft 85 in order to support a single cutting edge base frame 76 (as depicted, for instance, in FIG. 15), and in which the blade shaft 85 is intended to oscillate and not rotate, a combination grid key 33a may be used instead of grid keys 33. The shafts 34a and 34b will perform exactly as the shafts 34 of the grid keys 33. However, they will terminate respectively (as indicated in FIG. 7a) in the hollow standards 19a and 20a. The latter, unlike their counterparts hollow standards 19 and 20 which are open at one end only, are open at both ends. This construction is mandated here in order to allow the prong 148 to traverse the interior of the grid 1 to seat in the conforming recess 35 in the shaft 34b.

The inner sides 22 of the bearing blocks 21 have flange recesses 129 (FIGURES 4, 14, 15 and 17) encircling the apertures 26. These flange recesses 129 accommodate the flanged sections 90 of the stub shafts 87. This arrangement delimits the portions of the outer ends 92 of the stub shafts 87 which may enter the apertures 26; and, in so doing, serves as an important factor in stabilizing the positions of the related elements functioning between the opposed bearing blocks 21.

The bearing blocks 21, in the assembled shaver, rest snugly in the tri-walled sleeves 39 (FIG. 4) of the narrow inner walls 50 of the upper section 42 of the casing 41. These tri-walled sleeves 39 have overlapping walls 40 and apertures 54. The latter permit the entry of cotter pins 53, which are pressed through them and through the passages 55 (FIG. 4a) of the bearing blocks 21, to maintain intact the correct arrangement of the related members. Supplementing are the tops 51 of the narrow inner walls 52 of the lower section 43 of the casing 41 (FIGURES 4, 15 and 17). These tops 51, when the upper section 42 and the lower section 43 of the casing 41 are joined together, rest in juxtaposition with the open ends 130 of the tri-walled sleeves 39 (providing them, in effect, with a fourth wall).

The three forms of the shaver are distinguishable by variations in the power mechanism.

The power mechanism of one form of the shaver (FIGURES 11 and 15) consists of a suitable electric motor (generally designated 57); a terminal 56 to which access may be had by a power cord through the terminal entrance 49 of the lower section 43 of the casing 41; a motor shaft 104, substantially coextensive with and parallel with the blade shaft 85, and capable of rotating in bearings 132; an extension 102 suitably attached to the power end 149 of the motor shaft 104 and, to all intensive purposes, integral with it; a combined counterweight and crank arm 101 affixed to the extension 102 and rotatable with it; a connecting arm 98 capable of pivoting on the crank pin 99 which is attached to and projects perpendicular from the combined counterweight and crank arm 101, the crank pin 99 engaging the connecting arm 98 through the aperture 133 in said connecting arm 98 and maintained in this position by the cotter pin 100; and a combined crank arm 96 and counterweight 95 which is integral with the stub shaft 87 utilized on the power side of the shaver, the crank arm 96 having a crank pin 97 affixed perpendicular to it which is capable of engaging the connecting arm 98 in pivoting arrangement through the aperture 134 in the connecting arm 98. The open motor space 58, within the casing 41, allows these members to cooperate freely.

When the shaver is completely assembled, and the grid keys (33 or 33a) are inserted so as to fix the position of the grid 1 in relation to the casing 41 and the shaft keys (30 or 30a or 30b) are removed from the instrument, the electric current may be permitted to flow through the terminal 56. The motor shaft 104 will begin to rotate. This motion will be transmitted to the extension 102 and the combined counterweight and crank arm 101. The connecting arm 98 will be activated, thereby causing the combined crank arm 96 and counterweight 95 to oscillate in short arcs for each complete revolution of the combined counterweight and crank arm 101. The related assembly, consisting of stub shafts 87 and blade shaft 85 (and the structure within the grid 1 supported thereon) will oscillate in unison. Thus, the cutting edges 79 of the cutting edge base frame 76 (already abutting the interior surface of the grid 1 because of the pressure induced by the thrust of the spiral spring 84 against the undercarriage of the cutting edge base frame 76) will sweep back-and-forth to coact with the perforations 2 of the grid 1.

The counterweights 101 and 95, supplemented by counterweight 127 attached to the blade shaft 85, are intended to minimize the vibration of the motor 57 and the strains caused thereby. It should be noted that the hook-shaped configuration of the counterweight 95 is designed to permit it to oscillate in its short arc in spite of the hollow standard 28 and the grid key (33 or 33a) which might otherwise interfere. Finally, the connecting arm 98 (depicted in the drawings as a straight member) may have to be curved so that its motion will not be impeded by the grid key (33 or 33a). Whether this is necessary, and to what extent, depends on the exact proportions and locations of members involved. In FIG. 11 for instance, should it be required, the bulge of such a curve would obviously be in the direction of the reference numeral 41.

The power mechanism of a second form of the shaver, illustrated in FIG. 14, utilizes an electric motor (generally designated 57a) of substantially the same dimensions as electric motor 57. This electric motor 57a has a comparatively short motor shaft 109 which is oriented at right angles to the blade shaft 85. An eccentric 108, appropriately integrated with one end of the motor shaft 109, rotates with the motor shaft 109 within the eccentric slot 107 of the vibrator arm 105. This will cause the vibrator arm 105 to pivot in a short oscillating arc on the vibrator pivot pin 106 (which is firmly embedded in the housing of the motor 57a). And this oscillating motion will be transmitted by the end of the vibrator arm 105, loosely lodged in the vibrator slot 103 (which is inoperative in connection with the first form of the shaver), to the combined counterweight and crank arm 101. The latter, in this embodiment capable of oscillating but not rotating on the extension 102a (which is rigidly embedded at its other end in the housing of the motor 57a), will cause the connecting arm 98 to respond. The effect on the related members will be similar to that already described in connection with the motor 57 and the first form of the shaver.

The power mechanism of the third form of the shaver, illustrated in FIGURES 16 and 17, utilizes an electric motor 57 but transmits the rotary motion of the motor shaft 104 to the parallel and substantially coextensive blade shaft 85 by means of a gear train. Here the gear 116, which is affixed to the extension 102 of the motor shaft 104, drives the gear 114. The gear 114, in turn, activates the gear 113. This follows because the gears 113 and 114 are both rigidly attached to the hollow connecting shaft 120 which is free to pivot on the gear pivot shaft 115 (which is firmly embedded in the housing of the electric motor 57). The gear 113 meshes with the gear 112. The latter is positioned, and is free to pivot, on the hollow standard 28 (which is attached perpendicular to the inner side 22 of the bearing block 21 intended for the power side of the shaver). The gear 112, finally, transmits its motion to the gear 111 which encircles and is integral with the stub shaft 87 (allocated to the power side of the shaver).

It should be noted, since in this embodiment the blade shaft 85 will rotate (by contrast with its oscillation in the previously described representations), that it is not only possible but desirable to mount two counterpoised cutting edge base frames 76 to the blade shaft 85. These can be simultaneously squeezed back, against the outward pressure of the spiral springs 84, toward the blade shaft 85. The combined assembly may then be pressed through the end annular member 6 into position within the grid 1.

The relating of the gears 111 and 112 to each other and the gears 112 and 113 to each other will pose no problems. The stub shaft 87 carrying the gear 111 (after being related to the blade shaft 85 and its associated members) will have its outer end 92 inserted into the aperture 26 on the inner side 22 of the bearing block 21. As the flanged section 90 settles into the flange recess 129 (which encircles the aperture 26 on the inner side 22) the gear 111 can be eased into engagement with the gear 112. This arrangement will be stabilized when the bearing blocks 21 (one for each side of the shaver), carrying between them all the associated members, are secured within their respective tri-walled sleeves 39 in the upper section 42 of the casing 41. And when the upper section 42 and the lower section 43 of the casing 41 are joined together, the gear 113 already positioned within the lower section 43, the gears 112 and 113 will pivot on their supporting members and their teeth will mesh.

It should be apparent from what has already been said that an orderly sequence of steps is necessary in the assembling of the shaver. We may begin with the lower section 43 of the casing 41.

Initially, the lower section 43 is an almost completely hollow shell with opposing outer wide walls 117 of generally rectangular configuration and opposing outer narrow walls 135 of similar configuration (FIGURES 1 and 2); there is no bottom wall (FIG. 3). A portion of these outer walls 117 and 135, extending completely around the perimeter of the lower section 43 when viewed from without, is cut away at the upper extremity to form a shelf 143 (FIGURES 4, 11–13, 15–17) on which the complementing portions of the upper section 42 of the casing 41 will seat when the two sections are joined together; the tops 51 of the narrow inner walls 52 (as already described) will close the open ends 130 of the tri-walled sleeves 39 of the upper section 42 (FIG. 4). Within, and integral with the lower section 43, is the casing block 65 (FIGURES 11–13, 15–17). This casing block 65 completely fills the upper extremity between the outer walls 117 but does not on either side reach the narrow inner walls 52, thereby providing in part for the motor space 58 and the debris space 59 (FIG. 15). The bottom 136 of the casing block 65 is flat and of rectangular configuration. The top 137 of the casing block 65 is shaped into an arcuate transverse recess designed to receive without contacting an approximate semi-cylindrical portion of the grid 1 when the upper section 42 and the lower section 43 of the casing 41 are joined together. The rib 138 (FIGURES 11 and 16), on the power side of the shaver, is designed to project above the general plane of the top 137 and to overlap without contacting the grid end 123; its function is to discourage the flow of debris into the motor space 58. The arcuate surface of the top 137 is cooped out to form several transverse arcuate hollows 70 (FIGURES 13, 15 and 17) which are bounded on the power side of the shaver by bearing material 67 and on the debris side by bearing material 66 (respectively integrated with the casing block 65, as can be ascertained from FIGURES 11, 12, 15–17). The bearing material recesses 139 (FIGURES 15 and 17) are designed to receive and permit the rotation of the opposed pins 69 (one of each pair being retractable) of the rollers 68 (also visible in FIGURES 12 and 13), which seat in the transverse arcuate hollows 70 in such fashion as to barely contact and give support to the outer surface of the grid 1.

In assembling, all of the rollers 68 may be immediately positioned except that provided for the central transverse arcuate hollow 70 (FIGURES 15 and 17). This particular transverse arcuate hollow 70 has two apertures 71 to receive the bolts 72, which are threaded through the casing block 65 and into conforming apertures 140 in the housing of the electric motor (57 or 57a, as the case may be). The electric motor (57 or 57a) with all its appurtenances must, of course, first be eased into a position of contact with the bottom 136 of the casing block 65 through the open bottom of the lower section 43 of the casing 41. The bolts 72, supplemented by the bolts 75 (FIG. 1) which are threaded through the apertures 74 (in each outer wide wall 117 of the lower section 43) and into the housing of the electric motor (57 or 57a), will securely maintain the electric motor (57 or 57a) in place within the lower section 43. In the two forms of the shaver (FIGURES 11, 14 and 15) employing a connecting arm 98 care must be exercised, however, to correctly direction the said connecting arm 98 since it will be impossible to accomplish this after the electric motor (57 or 57a) has been bolted into position. Thereafter, the final roller 68 may be fitted into the central transverse arcuate hollow 70.

The partition 60 (FIGURES 12 and 15), which is rectangular in shape and has a rib 61 completely surrounding its perimeter, may be slid into position so that one rectangular side 141 faces the motor (57 or 57a) and the other rectangular side 141 faces the narrow inner wall 52 located on the debris side of the shaver. This is accomplished by pressing the rib 61 through the bottom of the lower section 43 into the conforming channel 62 cut into the two opposing inner sides of the outer wide walls 117 until the portion of the rib 61 skirting one narrow edge of the partition 60 rests in the part of the channel 62 which has been cut into the bottom 136 of the casing block 65. The electric motor (57 or 57a) is now completely isolated from the debris space 59.

This latter situation will be stabilized, and the assembly of the lower section 43 of the casing 41 completed, by fastening the bottom wall 44 (FIGURES 3, 11–13, 15 and 16) into place. The bottom wall 44 is rectangular in configuration; its dimensions are such that when inserted so that the channel 64 (FIG. 15) receives the remaining portion of the rib 61 of the partition 60 it will rest against the housing of the electric motor (57 or 57a) with its long edges flush with the inner sides of the outer wide walls 117 of the lower section 43. The bolts 45 (FIG. 3) may now be threaded through the apertures 46 and into the housing of the electric motor (57 or 57a). The thin trapdoors 47 (FIGURES 3 and 15), one sprung-hinged 48 to each narrow side of the bottom wall 44, will seat in the shelves 63 cut into the narrow inner walls 52 and the adjacent portions of the inner sides of the outer wide walls 117. One trapdoor 47 will allow the evacuation of the debris of shaving from the debris space 59; the other will permit limited access for cleaning and oiling into the motor space 58.

The upper section 42 of the casing 41 (in conjunction with the lower section 43) is designed to shelter an approximate semi-cylinder of the grid 1, the balance of the grid 1 being exposed (FIGURES 1, 2, 11–13, 15–17). Accordingly, the transverse grid opening 131 is provided; and when the grid 1 is correctly positioned and secured within the hollow shell of the upper section 42, the grid ends 123 and 124 will rise slightly above the extreme upward curve of the narrow side walls 142 whereas approximately half of the outer surface of the grid 1 will be visible and available for shaving. At no point will the grid 1 actually contact the upper section 42, for it must be capable of rotating and oscillating when the instrument is adapted to manual power.

The grid 1 must be associated with its cooperating members before it can be positioned as described. The blade shaft 85 (FIGURES 13–15 and 17) is the proper starting point.

The hollow standard 82 affixed perpendicular to the blade shaft 85 is encircled by the spiral spring 84. Then the splined projection 81 affixed perpendicular to the undercarriage of the cutting edge base frame 76 is seated in the conforming recess 83 of the hollow standard 82 so that the spiral spring 84 encircles the union thus created. This must be done in such fashion as to assure that the cutting edge bases 77 and the cutting edges 79 are disposed parallel with the blade shaft 85. Naturally, if it is proposed to utilize counterpoised cutting edge base frames 76 (as in FIG. 17), this process will have to be repeated for a second cutting edge base frame 76 and its related members. The cutting edge base frame 76 or the counterpoised cutting edge base frames 76, as the case may be, are then pressed (against the outward thrust of the spiral springs 84) back toward the blade shaft 85. The related assembly may now be eased into the grid 1 interior through the end annular member 6 at the grid end 123 (FIGURES 1, 2, 8, 9, 11, 15 and 17) and positioned so that the recesses 80 of the cutting edges 79 bridge the internal annular members 5 reinforcing the grid 1.

The splined projection 88 of the stub shaft 87 intended for the power side of the shaver (FIG. 14) is now passed through the expanded section 16 and the hub aperture 15 of the grid plate 11 (FIGURES 8, 11, 15 and 17) and then into the adjacent conforming recess 86 of the end 94 of the blade shaft 85 (FIG. 14). The splined projection 88 of the other stub shaft 87 (FIG. 14) is similarly passed through the expanded section 18 and the hub aperture 17 of the grid plate 12 (FIGURES 8 and 12) and then into the conforming recess 86 of the other end 94 of the blade shaft 85. The grid plate 12 is now related to the grid end 124 so that the sprockets 14 are seated in the sprocket recesses 8 of the end annular member 7 (FIGURES 8, 9, 12 and 15). The grid plate 11 is next related to the grid end 123 so that its sprockets 14 are seated in the sprocket recesses 8 in the end annular member 6 (FIGURES 8, 9 ,11, 15–17); care must be exercised however, in accomplishing this, to assure that the aperture 24 and the hollow standard 19 of the grid plate 11 are disposed in a straight line with the corresponding aperture 25 and hollow standard 20 of the grid plate 12, the said line paralleling the ultimate position of the blade shaft 85. When this latter move is accomplished, the blade shaft 85 ends 94 will rest respectively in the expanded sections 16 and 18 within the grid 1 interior. Pressure may now be imposed on the outer ends 92 of the stub shafts 87 so that the splined projections 88 will completely occupy the conforming recesses 86 in the ends 94 of the blade shaft 85; and the smooth rounded sections 89 will come to rest respectively in the hub apertures 15 and 17 and the stub shaft 87 inner ends 91 in the expanded sections 16 and 18. Thus, the grid plates 11 and 12 will each be locked into position between a cooperating inner end 91 of the stub shaft 87 and an end 94 of the blade shaft 85 (FIGURES 14 and 15). It should be noted, furthermore, that this arrangement will provide pivoting means whereby (as required) both the grid 1 and the blade shaft 85-stub shafts 87 assembly may rotate and oscillate.

Incidentally, in the two forms of the shaver in which the cutting edges 79 are designed to oscillate (FIGURES 11, 14 and 15), care must be exercised to align the stub shafts 87 with the blade shaft 85 in a fashion which will assure that the crank arm 96 (when related to the connecting arm 98) will be able to move in an arc calculated to oscillate the cutting edges 79 within the portion of the grid 1 exposed by the transverse grid opening 131 in the upper section 42 of the casing 41. This can be accomplished either by placing distinctive markings on the tips of the splined projections 88 and at the entrances of the recesses 86 or, preferably, by using a splining configuration which will permit of no other alignment.

The bearing blocks 21 (FIGURES 4, 4a, 6, 6a, 14, 15 and 17) may now be added to the assembly. In the form of the shaver employing a gear train (FIGURES 16 and 17), it is of course imperative that the bearing block 21 with the hollow standard 28 which carries the gear 112 be utilized on the power side of the instrument. The outer end 92 of each stub shaft 87 is passed through the flange recess 129 and the aperture 26 from the inner side 22 of the cooperating bearing block 21 so that the flanged section 90 comes to rest in the flange recess 129. The bearing blocks 21, thus related to the other members, are thereafter inserted into their respective tri-walled sleeves 39 in the narrow inner walls 50 of the upper section 42 of the casing 41; and this will automatically expose an approximate semi-cylinder of the grid 1 in the transverse grid opening 131 of the upper section 42 (FIGURES 1, 2, 11–13, 15–17). The cotter pins 53 are inserted through the apertures 54 of the tri-walled sleeves 39 and the aligned passages 55 of the bearing blocks 21 (FIGURES 4, 4a, 14, 15, 17). The assembly within the upper section 42 is now complete and stabilized.

The upper section 42 and the lower section 43 of the casing 41 may now be joined together (FIGURES 1, 2, 11–13, 15–17). In the form of the shaver utilizing a gear train (FIGURES 16 and 17), except for making certain that the power sides and the debris sides are correctly matched, no further preparation is required. But in the other two forms of the invention (FIGURES 11, 14 and 15) it is first necessary to extend the connecting arm 98 as far as it will emerge from the motor space 58 in the lower section 43 and, with the crank arm 96 extended in the motor space 58 as far as it can emerge from the upper section 42 to meet it, the crank pin 97 is inserted into the aperture 134 in the connecting arm 98. Without disturbing the relationship just described, the upper section 42 and the lower section 43 are pressed together so that the complementing portions of the former are snugly accommodated on the shelf 143 which completely circumscribes the latter. The tops 51 of the narrow inner walls 52 of the lower section 43 will be flush with the open ends 130 of the tri-walled sleeves 39 of the upper section 42 and will assist in maintaining the bearing blocks 21 snugly imprisoned therein (FIGURES 4, 11–13, 15–17). The bolts 118 (FIG. 1) may now be threaded through the apertures 119 on each wide wall 144 of the upper section 42 and into the adjacent portions of the casing block 65 of the lower section 43; and thereby the two sections 42 and 43 of the casing 41 will be effectively secured to each other.

The shaver, though completely assembled, is at this point not yet quite ready for service. The user, depending on whether he wishes to adapt it to electric or manual operation, must make the necessary adjustments.

If the instrument is to be driven by electric power, the grid 1 must be manually rotated so that the cooperating members of the bearing blocks 21 and the grid plates 11 and 12 are aligned (as indicated in FIGURES 4, 4a, 8, 11, 12, 14, 15–17) for the reception of the grid keys (33 or 33a of FIGURES 7 and 7a respectively). Distinctive markings on the grid 1 and the upper section 42 of the casing 41 will facilitate this. The grid keys (33 and 33a) and their utilization have, for the most part, already been adequately described. It will suffice here to supplement with a few additional details. The key cap apertures 38 in the narrow side walls 142 of the upper section 42 of the casing 41 (FIGURES 1, 2, 15 and 17) are the initial points of entry for the grid keys (33 and 33a) since they expose the outer sides 23 of the bearing blocks 21 (FIGURES 4a, 14 15 and 17). The grid keys (33 or 33a) are inserted, through the key cap apertures 38, successively into the receiving members. The key caps 37 are then threaded into the key cap apertures 38 until the inner sides of their tops 145 abut the knobs 36 of the grid keys (33 or 33a) thereby securing the said grid keys (33 or 33a in place.

The grid 1 is now fixed in position relative to the casing 41, while the blade shaft 85-stub shafts 87 assembly (including its associated members) is free to pivot when the terminal 56 is connected with an electric outlet. The exposed portions of the grid 1 surface are drawn along the skin and the hairs trapped in the perforations 2 are clipped off as the oscillating (or rotating) cutting edges 79 coact. The serrated edge 9 (FIGURES 1, 8, 9, 12 and 15) may be used to guide long hairs (otherwise immune) into the cutting area of the grid 1 interior. And the debris of shaving, emerging from the interior of the grid 1 through the debris gaps 73 of the grid plate 12 and past the debris shield 13 (FIGURES 12 and 15), may be evacuated (without the necessity of dismantling the shaver) through the trapdoor 47 at the bottom of the debris space 59.

When the shaver is to be operated by manual power, the grid 1 must be able to oscillate and rotate when rolled on the skin while the blade shaft 85-stub shafts 87 assembly must be fixed in position relative to the casing 41 in such a way as to assure that the cutting edges 79 of a cutting edge base frame 76 are maintained abutting the interior surface of the exposed part of the grid 1 by the pressure of the spiral spring 84 on the undercarriage of the cutting edge base frame 76. The first condition can be met by removing the grid keys (33 or 33a) from the shaver. The second condition requires the utilization with the shaver of shaft keys (30, 30a or 30b).

If shaft keys 30 are used (FIGURES 4a and 5), the fin slits 110 in the outer ends 92 of the stub shafts 87 and the fin apertures 27 in the bearing blocks 21 can be so positioned as to assure the correct alignment of the aforesaid cutting edges 79 vis-a-vis the interior of the grid 1. But if shaft keys 30a or 30b are used (FIGURES 6 and 6a respectively), distinctive markings on the tips of the prongs 128a and 128b and on the outer ends 92 are required; or, preferably, a splining configuration should be utilized which will allow only a correct alignment.

The relating of the shaft keys (30, 30a and 30b) to the instrument has been carefully described earlier in this specification. As with the grid keys (33 and 33a) however, the key cap apertures 38 (FIGURES 1, 2, 15 and 17) are the initial points of entry into the shaver; the shaft keys (30, 30a and 30b) are inserted through the key cap apertures 38 successively into the receiving members. This done, the key caps 37 may be threaded into the key cap apertures 38 so that the inner sides of the tops 145 will abut the knobs 32 of the shaft keys (30, 30a or 30b) and stabilize the arrangement. It is thus possible to rotate and oscillate the grid 1 as it contacts the skin, while the cutting edges 79 are fixed in position relative to the casing 41. The hairs trapped in the perforations 2 of the grid 1 will be severed by the coaction of the perforations 2 and the cutting edges 79.

Before concluding, I must observe that the serrated edge 9 of the grid 1 (FIGURES 1, 8, 9, 12 and 15) can be employed in the trapping and cutting of long hairs while the apparatus is operated manually. This can be accomplished by fully inserting a grid key (33 or 33a of FIGURES 7 and 7a respectively) on one side of the shaver to fix the position of the grid 1 relative to the casing 41 and partially inserting a shaft key (30, 30a or 30b represented in FIGURES 4a, 5, 6 and 6a) on the other side. The latter requirement must be interpreted to mean that the fin (31, 31a or 31b) is not to engage the complementing portions of the outer end 92 of the stub shaft 87 and of the bearing block 21. Furthermore, the prong (128, 128a or 128b) of the shaft key (30, 30a or 30b) must, in this connection, be of a splined configuration. It is possible, under these circumstances, to hold the shaver in one hand, moving the serrated edge 9 on the skin; the knob 32 of the shaft key (30, 30a or 30b) can be held between the fingers of the other hand and twirled, the cutting edges 79 responding.

Having now described and illustrated my invention, it must be understood that modifications and adaptations may occur to those skilled in the art. The appended claims are intended to cover all structures which conform to the spirit and scope of the present invention.

I claim:

1. A shaver comprising: a perforated cylindrical grid flexed over end annular members affixed circumferentially abutting the interior surface, a grid plate with a hub aperture locked in each end annular member; a casing with an opening in one wall exposing a transverse section of the grid; a blade shaft traversing the grid interior, at least one cutting edge transversely abutting the interior grid surface mounted on members supported thereon; two stub shafts, a projection from an inner end of each penetrating a hub aperture and locking to the adjacent blade shaft end the stub shaft, the grid rotatable between adjacent blade shaft and stub shaft ends; a bearing block secured adjacent each of opposed inner walls of the casing receiving for pivotal movement a delimited outer end of a stub shaft; a grid key completely penetrating a bearing block linking and locking to it the adjoining grid plate thereby maintaining stationary the grid; a motor with a motor shaft mounted in the casing; means drivingly interrelating motor shaft and cutting edge; an aperture in the casing wall through which the grid key can be removed; and a shaft key, effective subsequently through an aperture in a casing wall, penetrating into and locking to each other the outer end of a stub shaft and the adjacent bearing block thereby maintaining stationary the related stub shafts and blade shaft, the shaver thereafter operative as the grid rotates subject to traction induced when manually pressed against and rolled on a surface to be shaved.

2. A shaver according to claim 1 with at least one grid end having a serrated edge molded to and supported by a section of an end annular member which is conformably serrated to the limited extent allowed by the relatively thin end annular member, the basic structural continuity of the end annular member nevertheless maintained intact.

3. A shaver according to claim 1 with each grid plate locked in its respective end annular member by means of sprockets integral with the grid plate and protruding from its edges seated in conforming sprocket recesses in the end annular member, the grid plate so maintained by the inner end of a stub shaft locked to an end of the blade shaft by a projection penetrating the hub aperture of the grid plate.

4. A shaver according to claim 1 with a sleeve in each of opposed inner walls of the casing accepting and positioning a bearing block, the said bearing block receiving for pivoting movement in an aperture the outer end of a stub shaft whose penetration is limited by an encircling flange which abuts the inner side of the bearing block.

5. A shaver according to claim 1 with parallel motor shaft and related blade and stub shafts, motor shaft and blade shaft drivingly interrelated by means of a gear train connecting the aforesaid motor shaft with at least one stub shaft.

6. A shaver according to claim 1 with parallel motor shaft and related blade and stub shafts, a first crank arm rotatable with the motor shaft, a second crank arm movable with a stub shaft, and a connecting arm interconnecting said crank arms for converting the rotary motion of said motor shaft to oscillating movement of said stub shaft.

7. A shaver according to claim 1 with a motor shaft oriented at right angles to the related blade and stub shafts; a vibrator arm capable of pivoting on a pin embedded in the housing of the motor and contacting it at a point between its ends; an eccentric affixed to an end of the motor shaft and seating in an eccentric slot forming one end of the vibrator arm for converting the rotary motion of the motor shaft to oscillatory movement of the vibrator arm; a first crank arm attached for pivotal movement to an extension embedded in the housing of the motor movable with the other end of the vibrator arm; a second crank arm attached to and movable with a stub shaft; and a connecting arm interconnecting said crank arms for transmitting the oscillatory motion of the first crank arm to the second crank arm.

8. A shaver according to claim 1 with means drivingly interrelating the motor shaft and the cutting edges positioned in a motor space in the casing in the general area adjacent to one grid end; debris gaps in the grid plate locked into the other grid end for allowing the evacuation of the debris of shaving from the grid interior; a debris space in the casing in the general area adjoining the debris gaps in the aforesaid grid plate, separated by a casing block and the motor from the motor space, for receiving the debris of shaving; and a trapdoor in a casing wall bounding the debris space for the elimination of the debris of shaving from the casing.

9. A shaver according to claim 1 with a shaft key consisting of at least a prong and a fin, the prong penetrating into a conforming recess in the outer end of the stub shaft and the fin lodging in both a fin slit in the aforesaid outer end of the stub shaft and in a fin aperture in the adjacent bearing block.

10. A shaver according to claim 1 in which the grid key is related to a bearing block and the adjacent grid plate by means of a shaft which can be inserted successively through a mating aperture in the bearing block and across a space in the casing into a mating aperture in the grid plate.

11. A shaver according to claim 1 in which the grid key is related to a bearing block and the adjacent grid plate by means of a shaft which can be inserted successively through a mating aperture in the outer side of the bearing block, a mating hollow standard affixed perpendicular to the inner side of the said bearing block, and across a space in the casing into a mating aperture in the adjacent grid plate.

12. A shaver according to claim 1 in which the grid key is related to a bearing block and the adjacent grid plate by means of a shaft which can be inserted successively through a mating aperture in the outer side of the bearing block, a mating hollow standard affixed perpendicular to the inner side of the said bearing block, and across a space in the casing through a mating aperture in the grid plate into a mating hollow standard affixed perpendicular to the said grid plate and projecting into the grid interior.

References Cited in the file of this patent

UNITED STATES PATENTS

| | | |
|---|---|---|
| 2,196,599 | Shryock | Apr. 9, 1940 |
| 2,282,725 | Jepson | May 12, 1942 |
| 2,334,995 | Dalkowitz | Nov. 23, 1943 |
| 2,467,417 | Wurtele | Apr. 19, 1949 |
| 2,503,159 | Lane | Apr. 4, 1950 |
| 2,797,479 | Jepson | July 2, 1957 |
| 2,824,454 | Rider | Feb. 25, 1958 |
| 2,867,038 | Bruecker | Jan. 6, 1959 |
| 2,890,522 | Bulova et al. | June 16, 1959 |
| 2,890,523 | Bulova et al. | June 16, 1959 |
| 2,903,789 | Schleifer | Sept. 15, 1959 |
| 2,982,020 | Bulova et al. | May 2, 1961 |

FOREIGN PATENTS

| | | |
|---|---|---|
| 869,317 | Great Britain | May 31, 1961 |